US010415572B2

United States Patent
Oshita et al.

(10) Patent No.: US 10,415,572 B2
(45) Date of Patent: Sep. 17, 2019

(54) ELECTRIC SUPERCHARGER

(71) Applicant: KABUSHIKI KAISHA TOYOTA JIDOSHOKKI, Kariya-shi, Aichi-ken (JP)

(72) Inventors: Makio Oshita, Aichi-ken (JP); Satoshi Umemura, Aichi-ken (JP); Yutaka Fujiki, Aichi-ken (JP); Toshihiro Yamamichi, Aichi-ken (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 130 days.

(21) Appl. No.: 15/349,339

(22) Filed: Nov. 11, 2016

(65) Prior Publication Data

US 2017/0138365 A1 May 18, 2017

(30) Foreign Application Priority Data

Nov. 16, 2015 (JP) ................. 2015-223941

(51) Int. Cl.
 *F04D 25/06* (2006.01)
 *H02K 5/173* (2006.01)
 (Continued)

(52) U.S. Cl.
 CPC .............. *F04D 25/06* (2013.01); *F02B 37/04* (2013.01); *F04D 17/10* (2013.01); *F04D 29/053* (2013.01);
 (Continued)

(58) Field of Classification Search
 CPC ........ F02B 39/10; F02B 39/005; F02B 37/04; F05D 2220/40; F04D 25/06;
 (Continued)

(56) References Cited

U.S. PATENT DOCUMENTS 4,862,024 A * 8/1989 Stingle ..................... H02K 9/19
 310/64
5,605,045 A * 2/1997 Halimi ..................... F01D 5/085
 310/52
(Continued)

FOREIGN PATENT DOCUMENTS

EP 2924261 A1 9/2015
EP 2940835 A1 11/2015
(Continued)

OTHER PUBLICATIONS

Communication dated Apr. 13, 2017 issued by the European Patent Office in counterpart European Application No. 16197054.6.
Communication dated Feb. 27, 2018, from Japanese Patent Office in counterpart application No. 2015-223941.

Primary Examiner — Nathan C Zollinger
(74) Attorney, Agent, or Firm — Sughrue Mion, PLLC

(57) ABSTRACT

There is provided an electric supercharger having a compressor including a compressor impeller, a motor housing, an electric motor rotationally driving the compressor, and a first bearing and a second bearing provided to support a shaft and a rotor in the motor housing. The first bearing is located on the compressor side of the rotor and the second bearing is located on the other side of the rotor. The motor housing includes a thermal conductive passage through which heat generated by a coil wound around a stator is transmitted to the first and second bearings. The thermal conductive passage between the coil and the first bearing is formed with a reduced thickness portion in such a way that thickness of the thermal conductive passage is reduced in a direction that is perpendicular to a direction in which the heat is transmitted through the thermal conductive passage.

3 Claims, 5 Drawing Sheets

(51) Int. Cl.
*H02K 5/20* (2006.01)
*H02K 9/22* (2006.01)
*F02B 37/04* (2006.01)
*F04D 17/10* (2006.01)
*F04D 29/053* (2006.01)
*F04D 29/056* (2006.01)
*H02K 5/18* (2006.01)

(52) U.S. Cl.
CPC ......... *F04D 29/056* (2013.01); *H02K 5/1732* (2013.01); *H02K 5/18* (2013.01); *H02K 5/20* (2013.01); *H02K 9/22* (2013.01); *Y02T 10/144* (2013.01)

(58) Field of Classification Search
CPC .. F04D 29/056; F04D 29/5806; F04D 29/053; F04D 17/10; H02K 9/22; H02K 5/18; H02K 5/20; H02K 5/1732; Y02T 10/144
USPC .......................................... 123/565; 417/407
See application file for complete search history.

(56) References Cited

U.S. PATENT DOCUMENTS

| | | | |
|---|---|---|---|
| 5,744,880 A | | 4/1998 | Kudoh et al. |
| 6,591,612 B2* | | 7/2003 | Bolz ................... F02B 33/40 |
| | | | 123/565 |
| 10,072,667 B2* | | 9/2018 | An ....................... F02B 39/00 |
| 2005/0248221 A1 | | 11/2005 | Bosen |
| 2016/0359382 A1 | | 12/2016 | Uetsuji et al. |

FOREIGN PATENT DOCUMENTS

| | | | | |
|---|---|---|---|---|
| JP | 11-050854 A | | 2/1999 | |
| JP | 2005-320967 A | | 11/2005 | |
| JP | 2007-321675 A | | 12/2007 | |
| JP | 2013-24041 A | | 2/2013 | |
| JP | 2013227889 A | * | 11/2013 | ............ F04D 25/06 |
| WO | 97/11263 A1 | | 3/1997 | |
| WO | 2014/024288 A1 | | 2/2014 | |
| WO | 2014/056717 A2 | | 4/2014 | |
| WO | 2015/122405 A1 | | 8/2015 | |

* cited by examiner

ELECTRIC SUPERCHARGER

BACKGROUND OF THE INVENTION

The present invention relates to an electric supercharger using an electric motor to drive a compressor.

In recent years, the number of vehicles mounted with an internal combustion engine such as a gasoline engine and a diesel engine provided with a supercharger such as a turbocharger has been increasing. Specifically, the number of vehicles mounted with an internal combustion engine having a small displacement for the vehicle size and equipped with a turbocharger for compensating for the power shortage due to the small displacement has been increasing. In general, a turbocharger is a mechanical device that drives a turbine by using exhaust gas of an internal combustion engine thereby driving a compressor to force extra air into the engine.

As is known to those skilled in the art, a response of supercharging tends to be delayed when the internal combustion engine is accelerated rapidly from a low speed and hence the flow rate of exhaust gas is low. To improve the response, a turbocharger provided with a variable nozzle in the turbine is used widely. To further improve the response, a turbocharger has been developed which is provided in addition to a mechanical turbocharger and uses an electric motor to drive a compressor.

There are known some electric supercharger or electric turbocharger in which a mechanical turbocharger is combined with an electric motor. The motor assists a turbine to drive a compressor temporally and compensates for the rotation of the compressor when the delayed response or the turbo lag is estimated. The motor also performs the supercharging continuously at a low rotational speed of the internal combustion engine. In other cases, a mechanical turbocharger and an electric supercharger are individually provided in series. The electric supercharger is operated temporarily to prevent the delayed response of supercharging, or it is operated continuously while the internal combustion engine is running at a low speed.

Japanese Patent Application Publication No. 2007-321675 (JP '675) discloses an electric turbocharger incorporating a mechanical turbocharger and an electric motor. The electric turbocharger described in the above Publication has a shaft having at one end thereof a compressor wheel and at the other end thereof a turbine wheel, and a rotor for an electric motor that is mounted on the shaft on the side thereof where the compressor wheel is mounted. In the electric turbocharger, a hole is formed in the shaft adjacently to the turbine wheel so as to reduce the sectional area of the thermal conductive passage of the shaft through which the heat of the turbine wheel is transmitted therefrom through the shaft to the rotor. Such structure suppresses the rise of temperature in the rotor without affecting the rigidity of the shaft.

Japanese Patent Application Publication No. 2005-320967 (JP '967) discloses an electric supercharger. The electric supercharger has therein a shaft, a compressor and a compressor housing disposed on one end of the shaft, and an electric motor including a rotor, a stator and a motor housing disposed on the other end of the shaft. The electric supercharger is used for compression and delivery of cryogenic temperature liquid, for example, delivery of liquefied natural gas (LNG) and releasing gas in air decomposition. It is undesirable for any part of the shaft including a bearing which is located adjacent to the electric motor to be cooled down to a cryogenic temperature due to rendering the lubricant in the bearing unserviceable. Furthermore, a permanent magnet of the rotor, if cooled down to a cryogenic temperature, being demagnetized is also undesirable. Additionally, a coil of the stator cooled similarly becomes susceptible to breakage by vibration because the material of the coil becomes brittle under a cryogenic temperature. In order to solve these problems, the electric supercharger described in the above-cited Publication has a separation wall made of an insulating material between the compressor housing and the motor housing.

The electric supercharger generally includes an electric motor unit having a shaft, a rotor, a stator and a motor housing, a compressor unit including a compressor housing and a compressor impeller mounted on the shaft at one end thereof, a bearing supporting the one end of the shaft, and a bearing supporting the other end of the shaft. The bearings are provided in the motor housing. As described in JP '967, the lubricating substance of the lubricant for the bearings fails to function as a lubricant also when the lubricant is subjected to an excessively high temperature, as well as to a very low temperature. Therefore, the heat to be transmitted to the bearings needs to be suppressed so that the temperature of the bearings does not exceed a predetermined high temperature. The coil of the electric motor generates a large amount of heat, especially in case that the internal combustion engine running at a low speed is supercharged continuously. The heat may raise the temperature of the bearings to a harmful temperature.

In the electric supercharger or electric turbocharger disclosed in JP '675, high temperature of exhaust gas can be suppressed to transmit to the rotor through the thermal conductive passage including the turbine and the shaft. However, it is found in the above Publication neither about a thermal conductive passage through which the heat generated by the coils of the electric motor is transmitted from the motor housing to the bearing, nor the indication that the conductive passage suppresses transmission of heat from the coils.

The electric supercharger disclosed in JP '967 is disadvantageous in that the separation wall made of a thermal insulation material and provided between the compressor housing and the motor housing increases the number of the parts of the electric supercharger. As with JP '675, JP '967 discloses nothing about a thermal conductive passage through which the heat generated by the coils of the electric motor is transmitted from the motor housing to the bearing and the effect of the thermal conductive passage to suppress the heat transmission.

The present invention, which has been made in light of the above-identified problems, is directed to providing an electric supercharger having a compressor and an electric motor and configured so as to suppress the transmission of heat generated by coils of the electric motor through a motor housing to a bearing.

SUMMARY OF THE INVENTION

In accordance with one aspect of the present invention, there is provided an electric supercharger including a compressor including a compressor impeller, a motor housing, an electric motor rotationally driving the compressor, and a first bearing and a second bearing provided to support the shaft and the rotor in the motor housing. The electric motor includes a shaft at one end thereof connected to the compressor impeller, a rotor mounted on the shaft, a stator fixed to the motor housing, and a coil wound around the stator. The electric motor is accommodated in the motor housing. The first bearing is located on the compressor side of the rotor and the second bearing is located on the other side of the rotor. The motor housing includes a thermal conductive passage through which heat generated by the coil is transmitted to the first and second bearings. The thermal conductive passage between the coil and the first bearing is formed with a reduced thickness portion in such a way that thickness of the thermal conductive passage is reduced in a direction that is perpendicular to a direction in which the heat is transmitted through the thermal conductive passage.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE EMBODIMENTS

Figure 1:
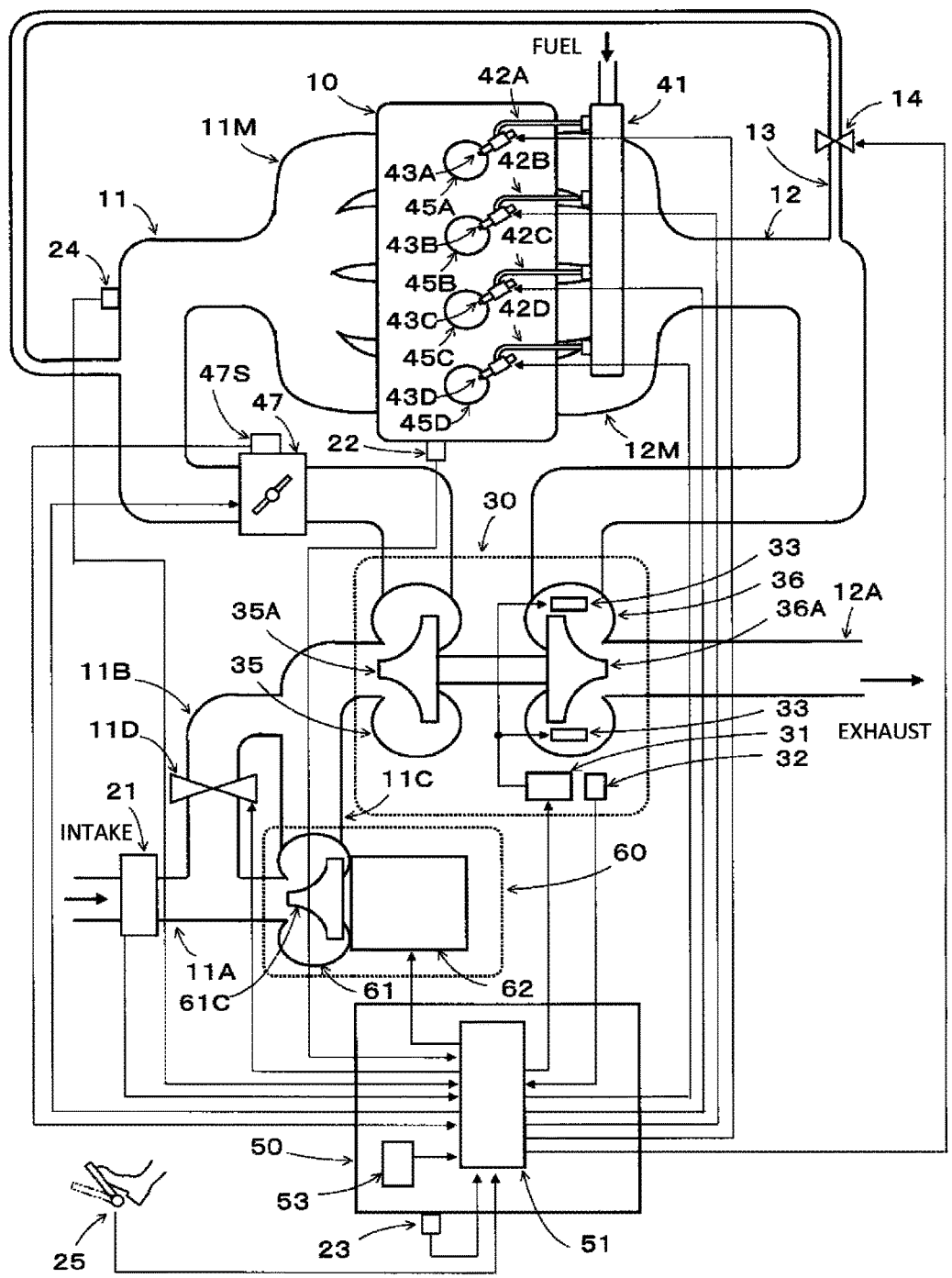
FIG. 1 is a schematic view of an internal combustion engine having an electric supercharger according to the present invention.

The following will describe embodiments according to the present invention with reference to the accompanying drawings. In the drawings having coordinates of X-axis, Y-axis, and Z-axis, the X-axis represents the direction in which the rotational axis 62X of a compressor impeller 61C and a shaft 62H extends. Referring to FIG. 1 illustrating in a schematic view an internal combustion engine having an electric supercharger 60 according to the present invention, the following will describe a four-cylinder diesel engine 10 as an example of an internal combustion engine.

An intake pipe 11 is connected to the engine 10 through an intake manifold 11M for introducing intake air into cylinders 45A, 45B, 45C, 45D. Additionally, an exhaust pipe 12 is connected through an exhaust manifold 12M to the cylinders 45A through 45D. The cylinders 45A through 45D are provided with injectors 43A through 43D connected to a common rail 41 through fuel pipes 42A through 42D, respectively. The intake pipe 11, an intake passage 11C, and an intake passage 11A form an intake line in which a compressor 35 of a turbocharger 30 and a compressor 61 of an electric supercharger 60 are provided in series. An exhaust pipe 12 and an exhaust passage 12A form an exhaust line in which a turbine 36 of the turbocharger 30 is provided.

The common rail 41 is supplied with fuel from a fuel tank (not shown in the drawings) and the fuel in the common rail 41 is kept at a high pressure. The fuel is supplied from the common rail 41 to the injectors 43A through 43D by way of the fuel pipes 42A through 42D, respectively. The injectors 43A through 43D are provided for the respective cylinders 45A through 45D to inject a metered amount of fuel at a controlled timing into the respective cylinders based on control signals by a control device 51.

The engine 10 includes a rotation detecting device 22 that detects the engine speed (or the rotating speed of the crankshaft) or the engine angle (or the angular position of the crankshaft corresponding to the top dead center of a piston in its cylinder bore). The control device 51 detects the engine speed and the engine angle of the engine 10 based on detecting signals from the rotation detecting device 22.

As shown in FIG. 1, the intake line of the internal combustion engine includes the intake passage 11A, the intake passage 11C, a bypass passage 11B, and the intake pipe 11 connected in this order as seen toward the engine 10. The upstream end of the bypass passage 11B is connected to the intake passage 11A. The downstream end of the bypass passage 11B is connected to the intake passage 11C. The intake line is provided with a flow rate detecting device 21, the electric supercharger 60, a bypass valve 11D, the turbocharger 30, an electric throttle device 47, a throttle opening sensor 47S, and a supercharge pressure detecting device 24. The following will describe each of the above devices and detection means provided in the intake line in order.

The flow rate detecting device 21 may be provided, for example, by a flow sensor provided in the intake passage 11A and operable to detect the flow rate of intake air. The control device 51 determines the flow rate of intake air drawn into the engine 10 based on a detecting signal from the flow rate detecting device 21.

The electric supercharger 60 includes the compressor 61 having the compressor impeller 61C and the electric motor unit 62 controlled by the control device 51. The input of the compressor 61 is connected to the downstream end of the intake passage 11A. The output of the compressor 61 is connected to the upstream end of the intake passage 11C. The bypass valve 11D is located in the bypass passage 11B and controlled by the control device 51. Responding to rapid acceleration requirement by a driver of the vehicle, the control device 51 determines whether supercharging only by the turbocharger 30 causes a turbo lag or a delay in supercharging. If it is determined by the control device 51 that a delay will occur, the control device 51 drives the electric motor unit 62 of the electric supercharger 60 temporally and closes the bypass valve 11D. If it is determined by the control device 51 that supercharging should be performed though the engine speed in a low speed region, the control device 51 drives the electric motor unit 62 of the electric supercharger 60 and closes the bypass valve 11D. Then, when the control device 51 confirms that the turbocharger 30 supercharges the engine 10 sufficiently, the control device 51 stops driving of the electric motor unit 62 of the electric supercharger 60 and opens the bypass valve 11D. The compressor 61 in operation takes in air from the intake passage 11A and compresses the air, and the compressed air is discharged into the intake passage 11C for supercharging the engine 10.

The turbocharger 30 includes a compressor 35 having a compressor impeller 35A and a turbine 36 having a turbine impeller 36A. The turbine 36 has a variable nozzle 33 that controls flow speed of exhaust gas flowing to the turbine impeller 36A. The operation of the variable nozzle 33 is adjusted by a driver 31. Specifically, the driver 31 receives a control signal from the control device 51 and adjusts the opening of the variable nozzle 33 based on the signal. The opening of the variable nozzle 33 is detected by an opening detection device 32.

The downstream end of the intake passage 11C with respect to the flowing direction of air in the intake passage 11C is connected to the input of the compressor 35, while the upstream end of the intake pipe 11 is connected to the output of the compressor 35. Intake air is flowed from the intake passage 11C or the bypass passage 11B to the compressor 35 and compressed by the compressor impeller 35A in the compressor 35. The compressed air is discharge into the intake pipe 11 for supercharging the engine 10.

The downstream end of the exhaust pipe 12 with respect to the flowing direction of air in the exhaust pipe 12 is connected to the input of the turbine 36, while the upstream end of the exhaust passage 12A is connected to the output of the turbine 36. The exhaust gas having a high temperature and a high pressure is flowed from the exhaust pipe 12 into the turbine 36 to rotate the turbine impeller 36A and hence the compressor impeller 35A and then into the exhaust passage 12A.

The electric throttle device 47 is located in the intake pipe 11 of the intake line and controls the opening of the intake pipe 11 thereby to adjust the flow rate of intake air based on a control signal from the control device 51. The control device 51 generates the control signal to the electric throttle device 47 to control the opening of the intake pipe 11 and determines the opening degree of the electric throttle device 47 based on a detection signal from the throttle opening sensor 47S.

The supercharge pressure detecting device 24 is positioned in the intake pipe 11 and provided, for example, by a pressure sensor. The control device 51 determines the supercharging air pressure in the compressor 35 based on the detection signal from the supercharge pressure detecting device 24.

The exhaust pipe 12 and the intake pipe 11 are connected to each other through an EGR passage 13 through which exhaust gas in the exhaust pipe 12 is recirculated to the intake pipe 11. An EGR valve 14 is provided in the EGR passage 13 and controls the opening of the EGR passage 13 based on a control signal from the control device 51.

Numeral 50 designates a control unit having therein at least the control device 51 and a storage device 53. The control device 51 may be provided, for example, by a central processing unit (CPU) that receives detection signals from various detecting devices to determine the state of operation of the engine 10 and generates control signals to energize or operate the injectors 43A through 43D, the EGR valve 14, the electric throttle device 47, the driver 31 for the variable nozzle 33, the electric supercharger 60, and the bypass valve 11D. Input to the control device 51 and output from the control device 51 are not limited in the example as shown in FIG. 1. For example, it may be so configured that the control device 51 receives information on the state of operation of a transmission transmitting the drive force of the internal combustion engine to wheels and determines the gear position of the transmission such as first speed position, second speed position, third speed position and etc.

The storage device 53 may be provided, for example, by a Flash-ROM that stores a program and data used for executing the process of the control device 51.

An atmospheric pressure sensor 23 is provided in the control unit 50. The atmospheric pressure sensor 23 detects the atmospheric pressure and the control device 51 determines the atmospheric pressure based on a detection signal from the atmospheric pressure sensor 23.

An accelerator pedal depression sensor 25 is provided for the accelerator pedal. The accelerator pedal depression sensor 25 detects the amount of depression of the accelerator pedal and the control device 51 determines the amount of depression based on a detection signal from the accelerator pedal depression sensor 25.

First Embodiment

Figure 2:
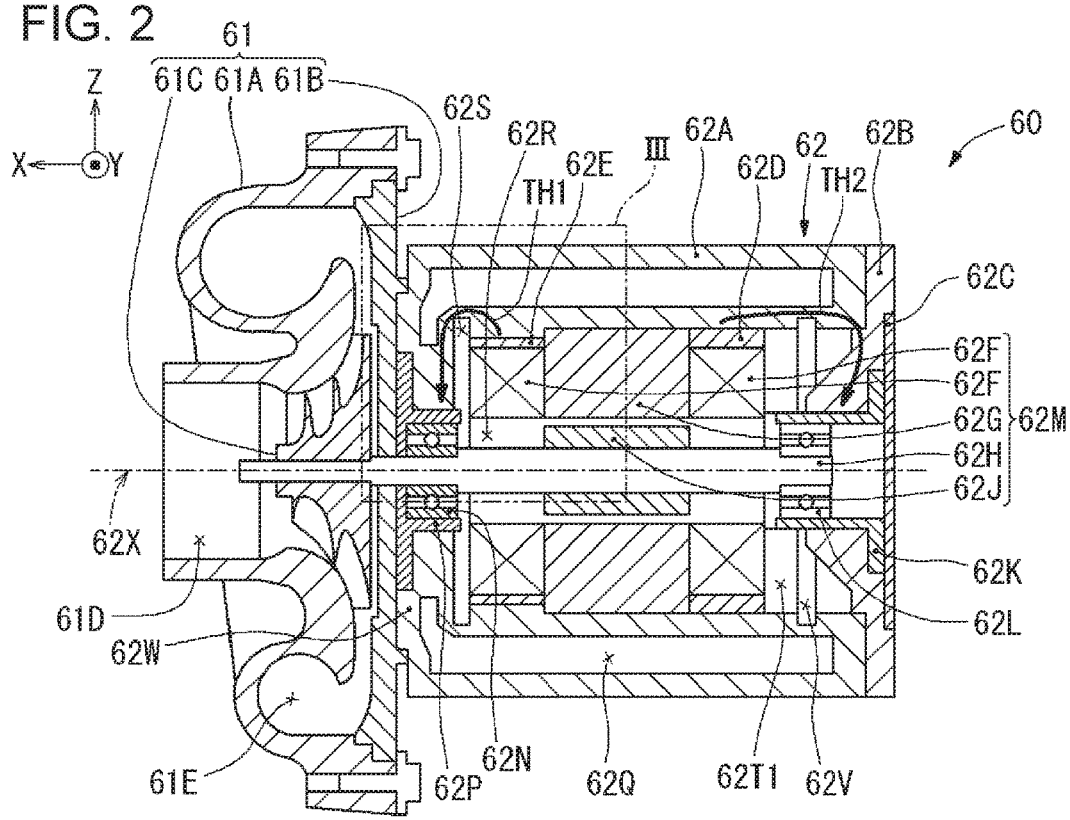
FIG. 2 is a longitudinal sectional view illustrating a structure of an electric supercharger according to a first embodiment of the present invention.
Figure 3:
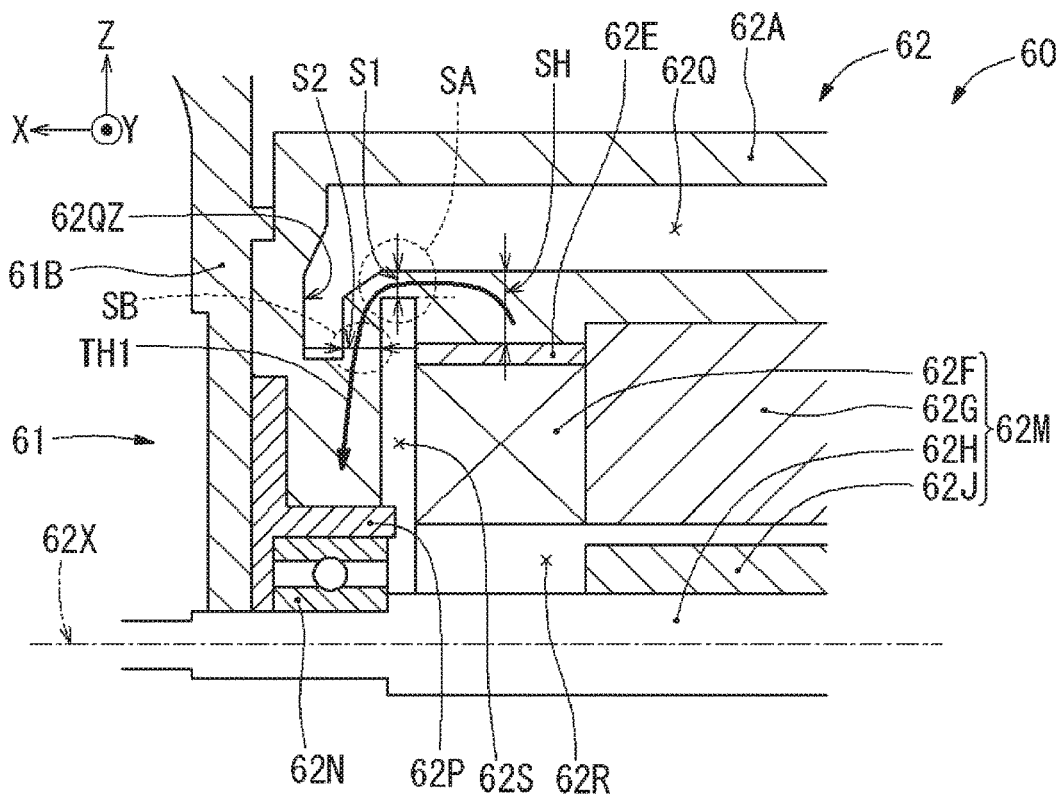
FIG. 3 is an enlarged fragmentary sectional view showing a part of the electric supercharger enclosed by two-dot chain line III in FIG. 2.

The following will describe an electric supercharger 60 according to a first embodiment of the present invention with reference to FIGS. 1 through 3. Referring to FIG. 2, the electric supercharger 60 includes the compressor 61 and the electric motor unit 62.

The compressor 61 has therein the compressor impeller 61C and compressor housings 61A, 61B. The compressor impeller 61C is mounted on one end of the shaft 62H of the electric motor unit 62 and rotatable around the axis X by the electric motor unit 62. The compressor housing 61A has therein an inlet port 61D and a scroll chamber 61E serving as an outlet port and accommodates therein the compressor impeller 61C. The compressor housing 61B covers the compressor housing 61A.

The electric motor unit 62 includes a cylindrical motor housing 62A, a housing plate 62C, bearing holders 62B, 62K, 62P, bearings 62L, 62N, the shaft 62H, a rotor 62J, coils 62F, and thermal grease 62D, 62E.

The rotor 62J including a permanent magnet is fixedly mounted on the shaft 62H for rotation therewith. A plurality of stators 62G is fixed to the inner periphery of the motor housing 62A around the outer periphery of the rotor 62J. Each stator 62G has a coil 62F that is wound and molded by resin. The thermal grease 62D, 62E is applied between the coil 62F and the motor housing 62A. The electric motor 62M includes the shaft 62H, the rotor 62J, the stators 62G, and the coil 62F.

The shaft 62H is rotatably supported by the bearings 62L, 62N provided in the motor housing 62A. It is noted that the bearings 62N, 62L correspond to the first and second bearings of the present invention, respectively. The bearing 62L supports one end of the shaft 62H (the right side of the shaft 62H in FIG. 2) and is held by the bearing holder 62K. The bearing holder 62K is held by a bearing holder 62B which is in turn fixed to the motor housing 62A. Thus, the bearing 62L supports the shaft 62H at a position opposite from the compressor impeller 61C and is secured to the motor housing 62A by way of the bearing holder 62K. A space 62T1 and an enlarged space 62V are formed between the bearing 62L and the coil 62F facing the bearing 62L in the direction of the axis 62X. The space 62V is formed extending radially outward. A reduced thickness portion, which will be described later, is formed in the motor housing 62A by the space 62V.

The bearing 62N supports the other end of the shaft 62H (the left side of the shaft 62H in FIG. 2) and is held by the bearing holder 62P. The bearing holder 62P is fixed to the motor housing 62A. Specifically, the bearing 62N supports the shaft 62H at a position adjacent to the compressor and between the compressor and the coil 62F of the electric motor 62M. A space 62S is formed in the motor housing 62A on the compressor side of the coil 62F. The space 62S is formed extending radially outward around the axis 62X. A reduced thickness portion, which will be describe later, is formed in the motor housing 62A by the space 62S. A space 62R is formed between the coil 62F and the shaft 62H.

The cylindrical motor housing 62A has at one end thereof a cover 62W having therein a hole to engage with the bearing holder 62P and is opened at the other end thereof for accommodating the electric motor 62M in the motor housing 62A. The opening of the motor housing 62A is closed by the bearing holder 62B. The motor housing 62A has therein a jacket 62Q that is formed radially outward of the electric motor 62M having the coils 62F and in which cooling fluid is circulated for cooling the coils 62F. Most of the heat produced by the coils 62F is transmitted through the thermal grease 62D, 62E and the motor housing 62A to the jacket 62Q. The motor housing 62A accommodates the electric motor 62M accompanied by the housing plate 62C serving as a cover that is fitted in the bearing holder 62B.

In the internal combustion engine 10 as shown in FIG. 1, for example, when the accelerator pedal is depressed rapidly from an idling state of the engine 10 in which the engine speed is low and the flow of exhaust gas is small, the use of only the turbocharger 30 may cause a delayed response in supercharging the engine 10. In this case, the control device 51 estimates the delayed response in supercharging and causes the electric supercharger 60 to operate temporarily and the bypass valve 11D to close. The temporary operation of the electric supercharger 60 increases its rotational speed up to a predetermined level (for example, tens of thousands rpm) in a short period of time irrespective of the then rotational speed of the engine 10, thus supercharging the engine 10. Alternatively, when the control device 51 determines that supercharging should be performed through rotational speed of the engine 10 in a low speed region, the control device 51 causes the electric supercharger 60 to operate continuously for a predetermined period of time and the bypass valve 11D to close.

Since the electric supercharger 60 operates at a high rotational speed as mentioned above, the power consumption of the coils 62F is large and the heat generation of the coils 62F is also large, especially, in continuous operation of the electric supercharger 60. Therefore, the heat of the coils 62F may increase the temperature of the bearings 62N, 62L beyond their allowable temperature at which the lubricant such as grease functions properly to lubricate the bearings 62N, 62L. Part of the heat of the coils 62F is transmitted to the bearing 62L through a thermal conductive passage TH2 shown in FIG. 2, which includes the thermal grease 62D, the motor housing 62A, the bearing holder 62B, and the bearing holder 62K. Part of the heat of the coils 62F is transmitted to the bearing 62N through a thermal conductive passage TH1 shown in FIG. 2, which includes the thermal grease 62E, the motor housing 62A, and the bearing holder 62P.

The thermal conductive passage TH2 is longer than the thermal conductive passage TH1. Additionally, the distance for which the thermal conductive passage TH2 extends along the jacket 62Q is also longer than the distance for which the thermal conductive passage TH1 extends along the jacket 62Q. Therefore, the amount of heat which is transmitted through the thermal conductive passage TH2 to the bearing 62L is smaller than that which is transmitted through the thermal conductive passage TH1 to the bearing 62N. As a result, the temperature of the bearing 62L is kept within the allowable temperature thereof, whereas the heat which is transmitted through the thermal conductive passage TH1 to the bearing 62N may increase the temperature of the bearing 62N beyond the allowable level.

Referring to FIG. 3, the space 62S is formed extending radially outward to such an extent that the thickness S1 of the motor housing 62A between space 62S and the jacket 62Q is reduced relative to the average thickness SH of the motor housing 62A between the coil 62F and the jacket 62Q. As a result, a reduced thickness portion SA is formed in the motor housing 62A. The reduced thickness portion SA is formed at a position in the thermal conductive passage TH1 between the coil 62F and the bearing 62N, in such a way that the thickness of the motor housing 62A is reduced in a direction that is substantially perpendicular to the thermal conductive passage TH1 or to the direction in which the heat produced by the coils 62F is transmitted toward the bearing 62N. According to the present invention, the jacket 62Q may be dispensed with and the space 62S may be formed extending radially outward further.

An elongated jacket 62QZ is formed extending radially inward in the motor housing 62A in parallel relation to the space 62S. As a result, the motor housing 62A has a reduced thickness portion SB whose thickness S2 as measured between the space 62S and the radial jacket 62QZ is smaller than the average thickness SH between the coils 62F and the jacket 62Q. The reduced thickness portion SB is located at a position in the thermal conductive passage TH1 extending in the motor housing 62A toward the bearing 62N, and reduced in the direction that is substantially perpendicular to the direction in which the heat of the coils 62F is transmitted in the motor housing 62A toward the bearing holder 62P. According to the present invention, the radial jacket 62QZ may be dispensed with and the space 62S may be formed extending up to a position adjacent to the outer peripheral surface of the motor housing 62A in the axis 62X toward the compressor 61.

The reduced thickness portions SA, SB suppress the transmission of the heat generated by the coils 62F to the bearing 62N, so that the temperature of the bearing 62N can be kept within the allowable range of temperature for the bearing 62N (for example, about 120° C. for grease-sealed type bearing). The reduced thickness portions SA, SB are formed easily only by extending the space 62S.

As shown in FIG. 2, the space 62V may be formed extending radially outward to such an extent that the distance between the outer periphery of the space 62V and the jacket 62Q is smaller than the average distance between the coils 62F and the jacket 62Q and a reduced thickness portion is formed in the motor housing 62A. Such a reduced thickness portion may suppress the transmission of the heat generated by the coils 62F to the bearing 62L. Therefore, the temperature of the bearing 62L may be kept within the allowable range of temperature of the bearing 62L. In the thermal conductive passage TH2 shown in FIG. 2, if the heat transmitted to the bearing 62L is sufficiently low and the temperature of the bearing 62L is kept within the allowable range of temperature, the space 62V may be eliminated.

Second Embodiment

Figure 4:
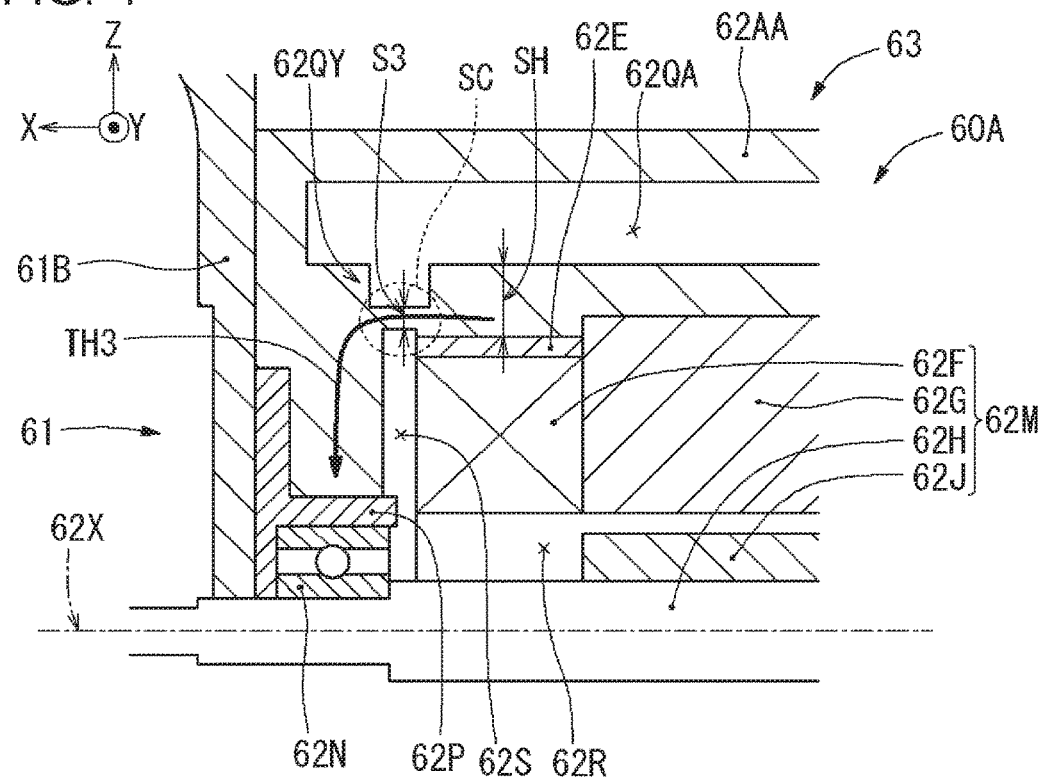
FIG. 4 is an enlarged fragmentary sectional view similar to FIG. 3, but illustrating the structure of an electric supercharger according to a second embodiment of the present invention.

The following will describe the structure of an electric supercharger 60A according to a second embodiment of the present invention with reference to FIG. 4, FIG. 4 is an enlarged fragmentary sectional view showing the bearing 62N of the electric supercharger 60A and its vicinity. The electric supercharger 60A according to the second embodiment differs from the electric supercharger 60 of the first embodiment shown FIG. 3 with respect to the shape of the jacket in the motor housing. The following will describe the difference.

Referring to FIG. 4, an annular recess 62QY is formed circumferentially in the motor housing 62AA at a position corresponding to the space 62S and recessed radially inward and toward the space 62S. As a result, a reduced thickness portion SC is formed having a thickness S3 between the space 62S and the recess 62QY that is smaller than the average thickness SH of the motor housing 62AA between the coils 62F and the jacket 62QA. The reduced thickness portion SC is provided at a position in the thermal conductive passage TH3 extending in the motor housing 62AA toward the bearing 62N, through which the heat generated by the coils 62F is transmitted, and narrows the thermal conductive passage TH3 in the direction that is substantially perpendicular to the direction in which the heat generated by the coils 62F is transmitted.

The reduced thickness portion SC may suppress the transmission of the heat generated by the coils 62F to the bearing 62N, with the result that the temperature of the bearing 62N is kept within the allowable range of temperature of the bearing 62N. The reduced thickness portion SC may be formed easily merely by the provision of the recess 62QY. In addition to the reduced thickness portion SC provided around the space 62S adjacent to the bearing 62N, such a similar reduced thickness portion may be provided around the space 62V adjacent to the bearing 62L shown in FIG. 2.

Third Embodiment

Figure 5:
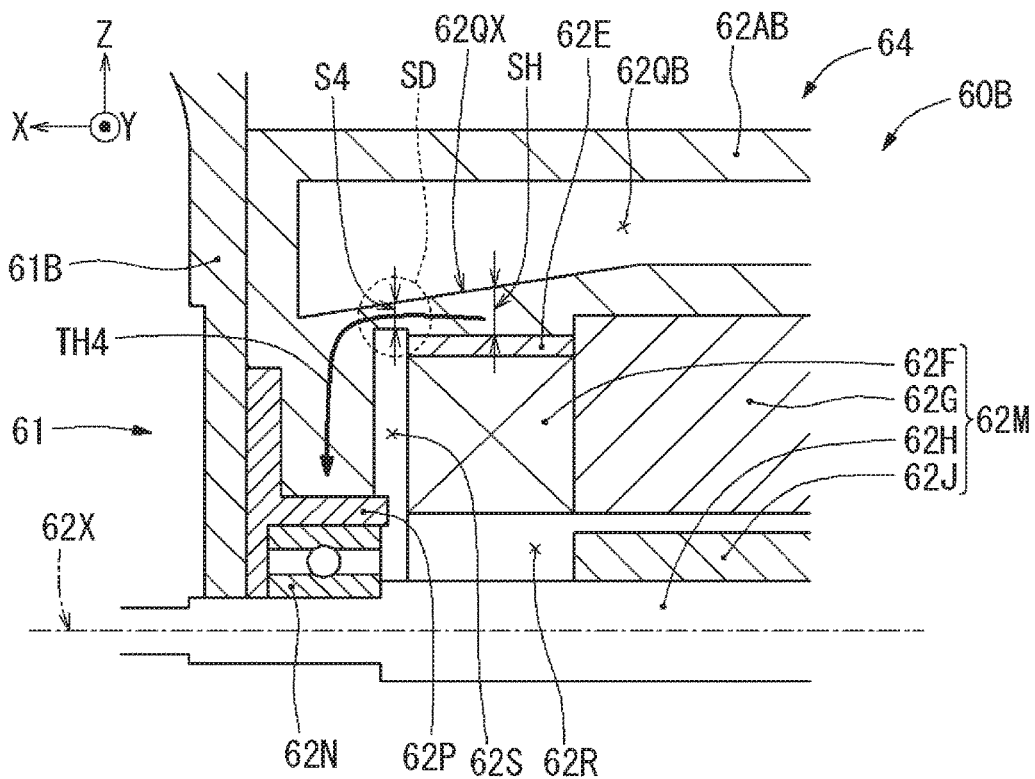
FIG. 5 is an enlarged fragmentary sectional view similar to FIG. 3, but illustrating the structure of an electric supercharger according to a third embodiment of the present invention.

The following will describe the structure of an electric supercharger 60B according to a third embodiment of the present invention with reference to FIG. 5. FIG. 5 is an enlarged fragmentary sectional view showing the bearing 62N of the electric supercharger 60B and its vicinity. The electric supercharger 60B according to the third embodiment differs from the electric supercharger 60 of the first embodiment with respect to the shape of the jacket in the motor housing. The following will describe the difference.

Referring to FIG. 5, a tapered surface 62QX is formed circumferentially in the jacket 62QB around the space 62S and tapered toward the compressor 61 (FIG. 2). As a result, a reduced thickness portion SD is formed having a thickness S4 between the space 62S and the tapered surface 62QX that is smaller than the average thickness SH between the coils 62F and the jacket 62QB. The reduced thickness portion SD is provided at a position in the thermal conductive passage TH4 extending in the motor housing 62AB toward the bearing 62N, through which the heat generated by the coils 62F is transmitted, and narrows the thickness of the thermal conductive passage TH4 gradually in the direction that is substantially perpendicular to the direction in which the heat generated by the coils 62F is transmitted.

The reduced thickness portion SD may suppress the transmission of the heat generated by the coils 62F to the bearing 62N, with the result that the temperature of the bearing 62N is kept within the allowable range of temperature of the bearing 62N. The reduced thickness portion SD may be formed easily merely by the provision of the tapered surface 62QX. In addition to the reduced thickness portion SD provided around the space 62S adjacent to the bearing 62N, such a similar reduced thickness portion may be provided around the space 62V adjacent to the bearing 62L shown in FIG. 2.

Fourth Embodiment

Figure 6:
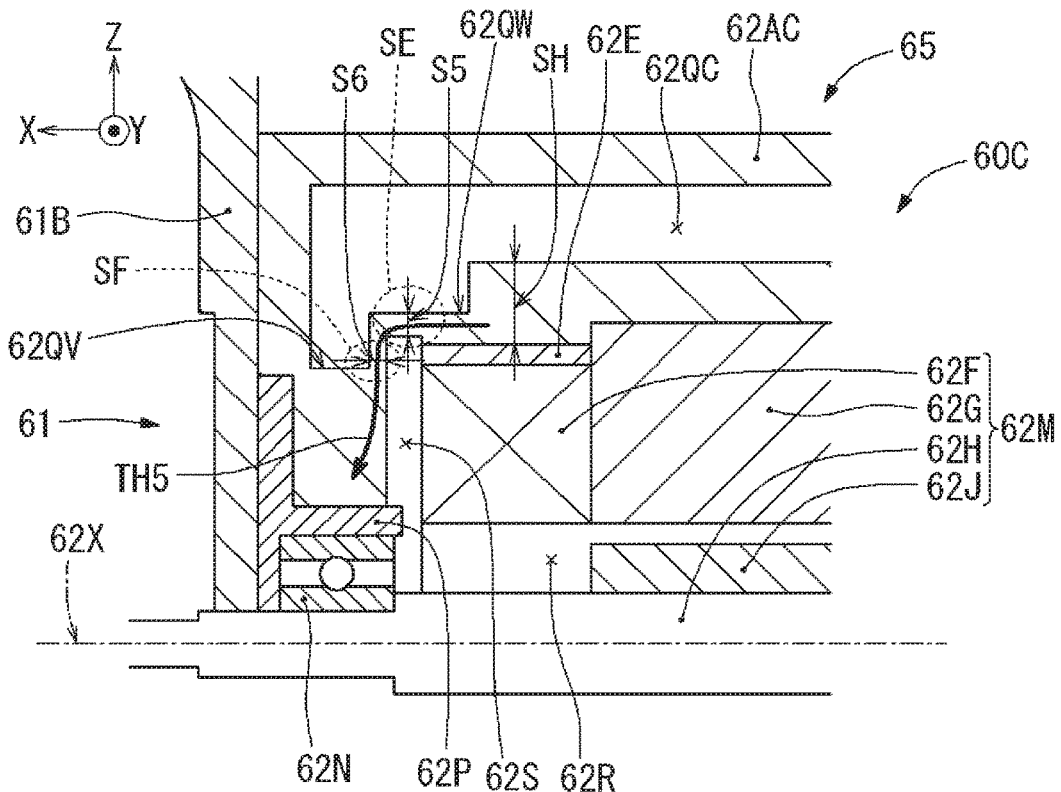
FIG. 6 is an enlarged fragmentary sectional view similar to FIG. 3, but illustrating the structure of an electric supercharger according to a fourth embodiment of the present invention.

The following will describe the structure of an electric supercharger 60C according to a fourth embodiment of the present invention with reference to FIG. 6. FIG. 6 is an enlarged fragmentary sectional view showing the bearing 62N of the electric supercharger 60C and its vicinity. The electric supercharger 60C according to the fourth embodiment differs from the electric supercharger 60 of the first embodiment with respect to the shape of the jacket in the motor housing. The following will describe the difference.

Referring to FIG. 6, stepped portions 62QW, 62QV are provided in the jacket 62QC circumferentially of the motor housing 62AC around a position corresponding to the space 62S. Specifically, the stepped portions 62QW, 62QV are formed so that the motor housing 62AC is stepped down in the jacket 62QC toward the compressor 61. As a result, a reduced thickness portion SE is formed having a thickness S5 between the space 62S and the stepped portion 62QW that is smaller than the average thickness SH between the coils 62F and the jacket 62QC. The reduced thickness portion SE is provided at a position in the thermal conductive passage TH5 extending in the motor housing 62AC toward the bearing 62N, through which the heat generated by the coils 62F is transmitted, and narrows the thermal conductive passage TH5 in the direction that is substantially perpendicular to the direction in which the heat generated by the coils 62F is transmitted.

Additionally, a reduced thickness portion SF is formed having a thickness S6 between the side surface of the space 62S adjacent to the stepped portion 62QV and the stepped portion 62QV that is smaller than the average thickness SH between the coils 62F and the jacket 62QC. The reduced thickness portion SF is provided at a position in the thermal conductive passage TH5 extending in the motor housing 62AC toward the bearing 62N, through which the heat generated by the coils 62F is transmitted, and narrows the thermal conductive passage TH5 in the direction that is perpendicular to the direction in which the heat generated by the coils 62F is transmitted.

The reduced thickness portions SE, SF may suppress the transmission of the heat generated by the coils 62F to the bearing 62N, with the result that the temperature of the bearing 62N is kept within the allowable range of temperature of the bearing 62N. The reduced thickness portions SE, SF may be formed easily merely by the provision of the stepped portions 62QW, 62QV. In addition to the reduced thickness portions SE, SF provided around the space 62S adjacent to the bearing 62N, such a similar reduced thickness portion may be provided around the space 62V adjacent to the bearing 62L shown in FIG. 2.

Fifth Embodiment

Figure 7:
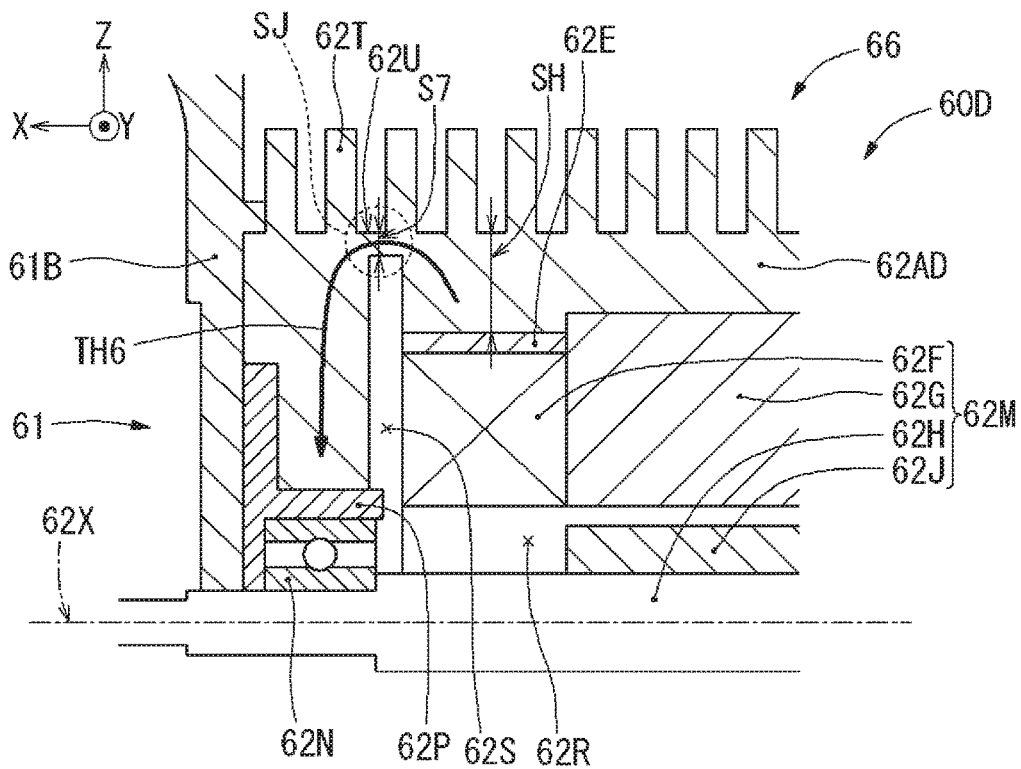
FIG. 7 is an enlarged fragmentary sectional view similar to FIG. 3, but illustrating the structure of an electric supercharger according to a fifth embodiment of the present invention.

The following will describe the structure of an electric supercharger 60D according to a fifth embodiment of the present invention with reference to FIG. 7. FIG. 7 is an enlarged fragmentary sectional view showing the bearing 62N of the electric supercharger 60D and its vicinity. The electric supercharger 60D according to the fifth embodiment differs from the electric supercharger 60 of the first embodiment shown in FIG. 3 in that the jacket such as 62Q is eliminated and instead a plurality of fins 62T and grooves 62U for dissipating heat are formed circumferentially of the motor housing 62AD of the electric motor unit 66 and spaced along the axis 62X of the shaft 62H. The following will describe the difference.

Referring to FIG. 7, the space 62S is formed extending radially outward to a position that is close to a groove 62U. As a result, a reduced thickness portion SJ is formed having a thickness S7 between the space 62S and the groove 62U that is smaller than the average thickness SH between the coils 62F and the groove 62U. The reduced thickness portion SJ is provided at a position in the thermal conductive passage TH6 extending in the motor housing 62AD toward the bearing 62N, through which the heat generated by the coils 62F is transmitted, and narrows the thermal conductive passage TH6 in the direction that is perpendicular to the direction in which the heat generated by the coils 62F is transmitted.

The reduced thickness portion SJ may suppress the transmission of the heat generated by the coils 62F to the bearing 62N, with the result that the temperature of the bearing 62N may be kept within the allowable range of temperature of the bearing 62N. The reduced thickness portion SJ are formed easily merely by extending the space 62S radially outward. In addition to the reduced thickness portion SJ provided around the space 62S adjacent to the bearing 62N, such a similar reduced thickness portion may be provided around the space 62V adjacent to the bearing 62L shown in FIG. 2.

Sixth Embodiment

Figure 8:
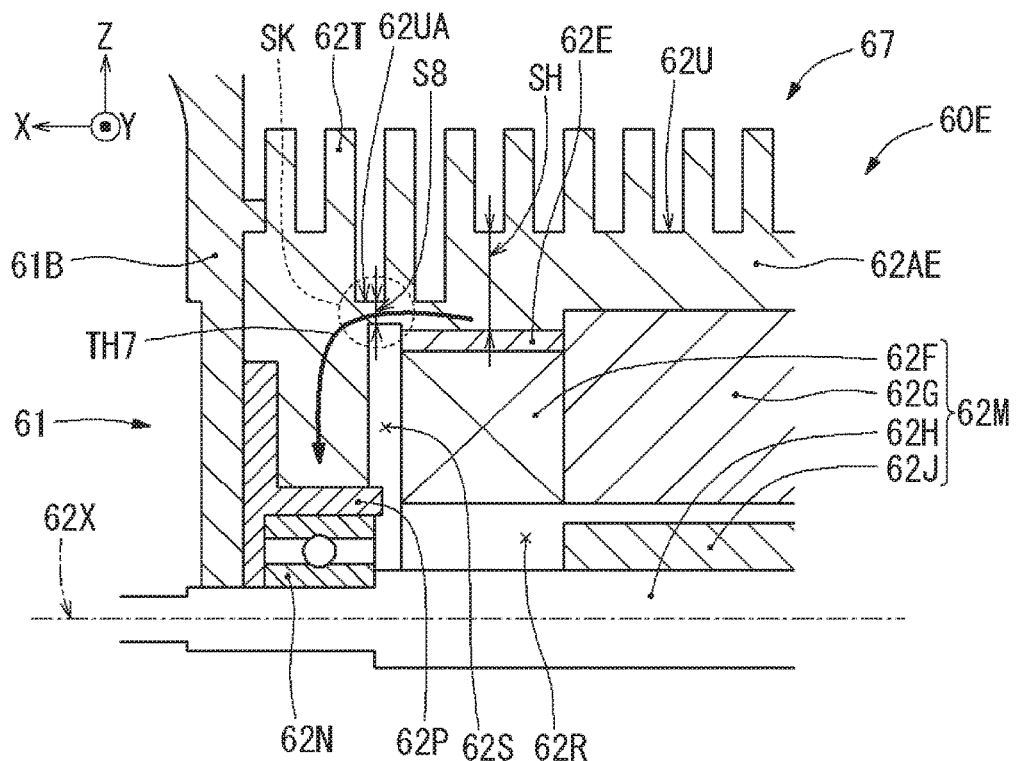
FIG. 8 is an enlarged fragmentary sectional view similar to FIG. 3, but illustrating the structure of an electric supercharger according to a sixth embodiment of the present invention.

The following will describe the structure of an electric supercharger 60E according to a sixth embodiment of the present invention with reference to FIG. 8. FIG. 8 is an enlarged fragmentary sectional view showing the bearing 62N of the electric supercharger 60E and its vicinity. The electric supercharger 60E according to the sixth embodiment differs from the electric supercharger 60 of the first embodiment shown in FIG. 3 in that the jacket such as 62Q is eliminated and instead a plurality of fins 62T and grooves 62U, 62UA for dissipating heat are formed circumferentially of the motor housing 62AE of the electric motor unit 67 and spaced along the axis 62X of the shaft 62H. The following will describe the difference.

Referring to FIG. 8, the space 62S is formed extending radially outward to a position that is close to the groove 62UA. As a result, a reduced thickness portion SK is formed so that the thickness S8 between the outer periphery of the space 62S and the groove 62UA is smaller than the average thickness SH between the coils 62F and the groove 62U. The reduced thickness portion SK is provided at a position in the thermal conductive passage TH7 extending in the motor housing 62AE toward the bearing 62N, through which the heat generated by the coils 62F is transmitted, and narrows the thermal conductive passage TH7 in the direction that is perpendicular to the direction in which the heat generated by the coils 62F is transmitted.

The reduced thickness portion SK may suppress the transmission of the heat generated by the coils 62F to the bearing 62N, with the result that the temperature of the bearing 62N may be kept within the allowable range of temperature of the bearing 62N. The reduced thickness portion SK is formed easily merely by extending the groove 62UA radially inward. In addition to the reduced thickness portion SK provided around the space 62S adjacent to the bearing 62N, such a similar reduced thickness portion may be provided around the space 62V adjacent to the bearing 62L shown in FIG. 2.

According to the present invention, the electric supercharger is not limited to the above-described embodiments, but may be modified variously within the scope of the present invention.

Application of the electric supercharger according to the present invention is not limited to the internal combustion engine which has been described with reference to FIG. 1, but the electric supercharger of the invention is applicable to various internal combustion engines.

The electric supercharger according to the present invention is not limited to the type of electric superchargers described in the context of the embodiments in which the electric supercharger and the mechanical turbocharger are provided separately, but it may be of a type in which the electric supercharger is integrated with the mechanical turbocharger, a type in which the electric supercharger and the electric turbocharger is provided separately from a mechanical turbocharger, or a type in which the electric supercharger is integrated with a mechanical supercharger.

What is claimed is:

1. An electric supercharger comprising;
a compressor including a compressor impeller;
a motor housing;
an electric motor rotationally driving the compressor, the electric motor including a shaft at one end thereof connected to the compressor impeller, a rotor mounted on the shaft, a stator fixed to the motor housing, and a coil wound around the stator, the electric motor being accommodated in the motor housing; and
a first bearing and a second bearing provided to support the shaft and the rotor in the motor housing, wherein the first bearing is located on the compressor side of the rotor and the second bearing is located on the other side of the rotor, wherein the motor housing includes a thermal conductive passage through which heat generated by the coil is transmitted to the first and second bearings, and wherein the thermal conductive passage between the coil and the first bearing is formed with a reduced thickness portion in such a way that thickness of the thermal conductive passage is reduced in a direction that is perpendicular to a direction in which the heat is transmitted through the thermal conductive passage,
wherein the motor housing has therein a jacket that is formed radially outward of the electric motor and in which cooling fluid is circulated,
wherein a space is formed in the motor housing adjacent to the compressor side of the coil and the first bearing, so as to continuously extend between the coil and the first bearing, and the space extends radially outward from the shaft,
wherein the reduced thickness portion is disposed radially outward from the space, so that a thickness of the reduced thickness portion is a distance from the space to the jacket in a radial direction,
wherein the thickness of the reduced thickness portion is smaller than a thickness of the housing located radially outward of the electric motor as measured from an inner circumferential surface of the housing that faces the shaft to an innermost wall surface of the jacket,
wherein thermal grease is provided between the coil and the motor housing.

2. The electric supercharger according to claim 1, wherein a second thermal conductive passage with a reduced thickness portion is provided between a second coil and the second bearing.

3. The electric supercharger according to claim 1, wherein the space that is formed in the motor housing on the compressor side of the coil, extends radially outward from an outer circumferential surface of the shaft.

* * * * *